United States Patent [19]

Mitsuhira et al.

[11] Patent Number: 5,155,853
[45] Date of Patent: Oct. 13, 1992

[54] DATA PROCESSOR OPERATING IN A VECTOR INTERRUPT MODE AND REGISTER BANK SWITCHING MODE WITH SELECTED BANK FOR INTERRUPT PROCESSING

[75] Inventors: Yuko Mitsuhira; Ichiro Kozono, both of Tokyo, Japan

[73] Assignee: NEC Corporation, Tokyo, Japan

[21] Appl. No.: 441,146

[22] Filed: Nov. 27, 1989

[30] Foreign Application Priority Data

Nov. 25, 1988 [JP] Japan .................. 63-298517

[51] Int. Cl.[5] .............. G06F 9/46; G06F 9/00
[52] U.S. Cl. .................. 395/725; 395/775;
364/DIG. 1; 364/280.8; 364/232.9; 364/242.1;
364/263.2
[58] Field of Search ... 364/200 MS File, 900 MS File;
395/725, 775

[56] References Cited

U.S. PATENT DOCUMENTS

| | | | |
|---|---|---|---|
| 4,631,363 | 12/1986 | Foster et al. | 379/15 |
| 4,769,768 | 9/1988 | Bomba et al. | 364/200 |
| 4,949,333 | 8/1990 | Gulick et al. | 370/32 |

*Primary Examiner*—Eddie P. Chan
*Attorney, Agent, or Firm*—Foley & Lardner

[57] ABSTRACT

A data processor comprises a central processing unit, a plurality of register banks used by the central processing unit when the central processing unit executes a given process, an interrupt controller responding to an interrupt request signal to generate an interrupt acknowledge signal and to select a predetermined register bank and also to start an interrupt handling program, a interrupt code generator for generating an interrupt code corresponding to an interrupt request when the interrupt request signal is generated, and an interrupt source register for holding the interrupt code after the interrupt request is acknowledged until a next interrupt request is acknowledged, so that a start address of the interrupt handling program is controlled in accordance with the contents of the interrupt source register.

3 Claims, 3 Drawing Sheets

FIGURE 2
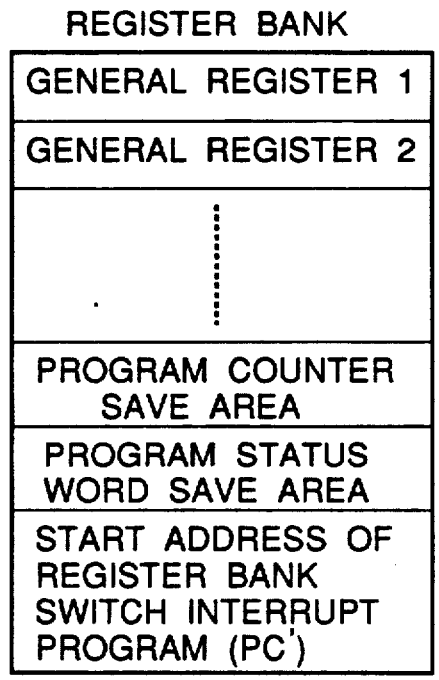
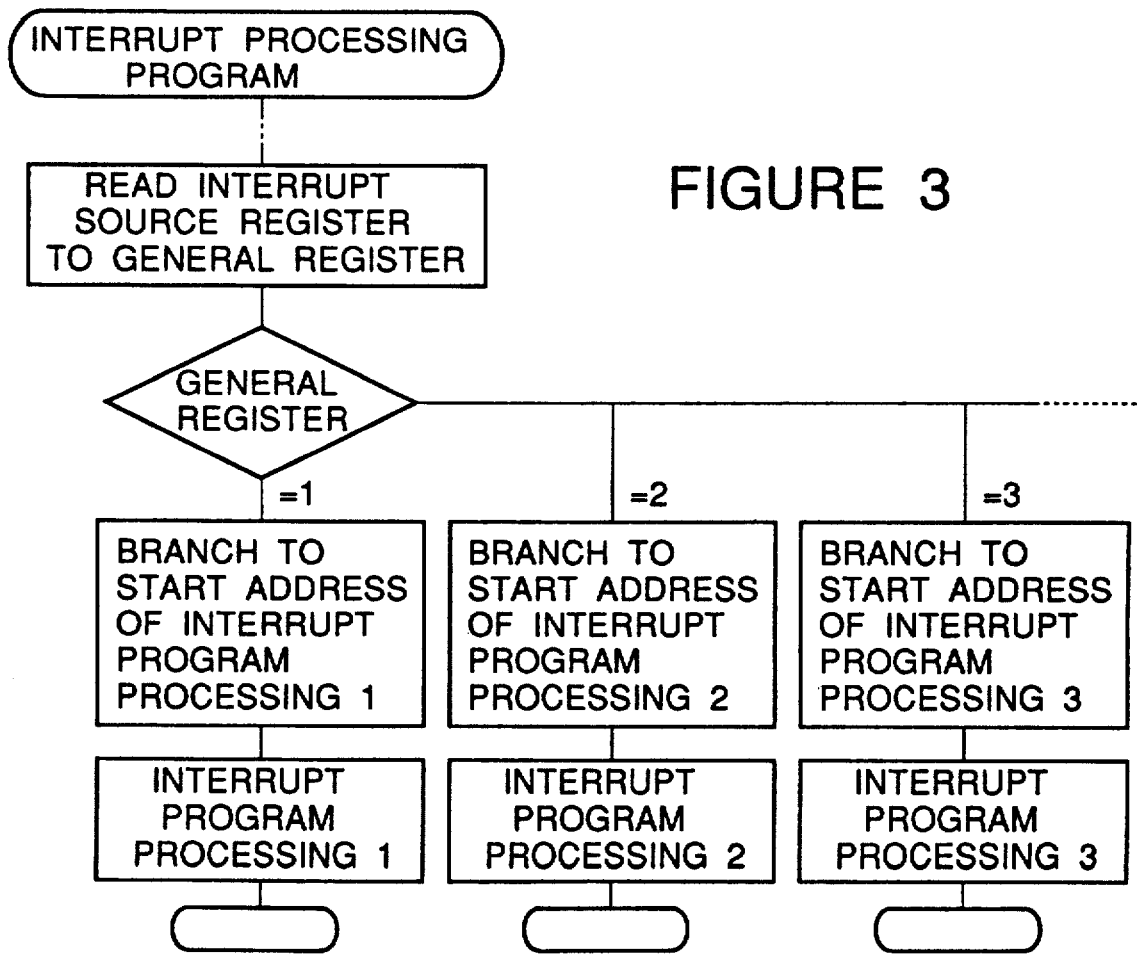
FIGURE 3

FIGURE 4

| ADDRESS | PROGRAM MEMORY |
|---|---|
| PC'+1 | BRANCH INSTRUCTION TO START ADDRESS OF INTERRUPT PROGRAM PROCESSING 1 |
| PC'+2 | BRANCH INSTRUCTION TO START ADDRESS OF INTERRUPT PROGRAM PROCESSING 2 |
| PC'+3 | BRANCH INSTRUCTION TO START ADDRESS OF INTERRUPT PROGRAM PROCESSING 3 |

DATA PROCESSOR OPERATING IN A VECTOR INTERRUPT MODE AND REGISTER BANK SWITCHING MODE WITH SELECTED BANK FOR INTERRUPT PROCESSING

BACKGROUND OF THE INVENTION

1. Field of the Invention

The present invention relates to a data processor, and more specifically to a data processor including a plurality of general register sets (called "register banks" hereinafter) used for data processing and operating to designate a predetermined register bank in response to an interrupt acknowledge signal responding to an interrupt request signal, and thereafter to execute an interrupt handling program.

2. Description of Related Art

Conventional microcomputer systems have included an interrupt controller, so that when an interrupt request signal is generated by a peripheral device during execution of a main program, a central processing unit (called "CPU" hereinafter) can interrupt the execution of the main program and then execute an interrupt handling program corresponding to the interrupt request signal generated by the peripheral device. If a number of peripheral devices are provided, a plurality of interrupt request signals can be concurrently or simultaneously generated in one case. On the other hand, in another case, when an interrupt handling program for an interrupt request signal from one peripheral device is under execution, another interrupt request signal can be generated by another peripheral device. In order to deal with the above mentioned conflict of a plurality of interrupt request signals, a priority level control has been needed, in which different priority levels are assigned to respective interrupt request signals, so that a handling program corresponding to an interrupt request signal having a high priority level is preferentially executed.

In general, a vector interrupt system and a register bank switching system have been known as interrupt processing systems for the microcomputer system. In the vector interrupt system, when an interrupt request signal is acknowledged, the contents of a program counter which designates an address of a main program under execution, and the contents of a program status word storing the status of the execution of the main program are saved in a memory stack. On the other hand, an interrupt code is generated in correspondence to the acknowledged interrupt request signal, and thereafter, a start address (called "vector address" hereinafter) of a handling program corresponding to the acknowledged interrupt request signal is produced on the basis of the generated interrupt code, and is set into the program counter, so that the interrupt handling program is executed. In the process of execution of the interrupt handling program, the contents of a general register are saved in the memory stack, similarly to the program counter and the program status word.

In this vector interrupt system, one interrupt code is determined for each of the interrupt requests, and therefore, a start address for an interrupt handling program is also determined for each of interrupt requests, so that the interrupt handling program corresponding to each give interrupt request can be started.

On the other hand, in the register bank switching system, a plurality of register banks are provided, and one of the plurality of register banks is selected in response to an interrupt request acknowledge signal, so that a branch is executed on the basis of the contents of the selected register bank.

More specifically, when an interrupt request signal is acknowledged, a register bank designation code is generated in correspondence to the acknowledged interrupt request signal, and set into a register bank designation register so as to designate a predetermined register bank within a data memory. As a result, the register bank to be accessed by the CPU is switched to the predetermined register bank corresponding to the given interrupt request signal. Each of the register banks includes a number of general registers, a program counter save area, a program status word save area, etc, and stores a start address of an interrupt handling program at a last portion of the register bank. Therefore, the CPU operates to save the contents of the program counter and the program status word in the program counter save area and the program status word save area of the newly selected register bank, and the start address of an interrupt handling program (namely, a new program counter value) stored in the newly selected register bank is set into the program counter, so that the interrupt handling program corresponding to each given interrupt request can be started.

In the above mentioned vector interrupt system, a great deal of time is required for processing, saving and returning to the general registers contents executed in the interrupt handling program, and therefore, operation efficiency of interrupt processing is very low. In the above mentioned register bank switching system, on the other hand, since it is not necessary to save and return contents of the general registers, operation efficiency is excellent as compared with that of the vector interrupt system. However, with an increase in functions performed by microcomputer systems, the microcomputer systems are apt to have an increased number of peripheral devices, and therefore, the number of interrupt requests generated by the peripheral devices have increased. But, it is practically or physically impossible to provide the microcomputer system with one individual register bank for each one of a number of interrupt requests, since a large memory capacity would have to be provided in the microcomputer system.

In order to avoid the number of interrupts designated in the register bank interrupt system from being limited by the number of register banks, it has been proposed to arrange interrupt requests into a limited number of groups and provide one register bank for each of the interrupt request groups. In this case, however, since interrupt processing is executed by using one register bank common to all the interrupts included in one interrupt request group, the start addresses for respective interrupt handling programs for respective interrupts included in one interrupt request group are the same. Therefore, during execution of an interrupt handling program, it is not possible to know by which of interrupt request sources in a selected interrupt request group an interrupt is triggered. As a result, only one interrupt request within each interrupt request group can be dealt with in the register bank switching system, while the other interrupt requests within each interrupt request group must be dealt with in the vector interrupt system.

SUMMARY OF THE INVENTION

Accordingly, it is an object of the present invention to provide a data processor which has overcome the above mentioned defect of the conventional one.

Another object of the present invention is to provide a data processor capable of dealing with a plurality of interrupt requests by using one register bank in common and also capable of discriminating an interrupt source for a triggered interrupt process in the course of the execution of the triggered interrupt handling program.

The above and other objects of the present invention are achieved in accordance with the present invention by a data processor comprising a central processing unit, a plurality of general register sets used by the central processing unit when the central processing unit executes a given process, an interrupt control unit responding to an interrupt request signal to generate an interrupt acknowledge signal and to select a predetermined general register set and also to start an interrupt handling program, a unit for generating an interrupt code corresponding to an interrupt request when the interrupt request signal is generated, a memory for holding the interrupt code after the interrupt request is acknowledged until a next interrupt request is acknowledged, and a unit for controlling a start address of the interrupt handling program in accordance with the contents of the memory.

With the above mentioned arrangement, there is provided a unit for holding the interrupt code after the interrupt request is acknowledged until a next interrupt request is acknowledged. Since the interrupt code indicates an interrupt request source, it is possible to discriminate the interrupt request source during triggered interrupt processing in accordance with the register bank switching system, by reading the contents of the above interrupt code holding memory by means of an instruction operation of a CPU.

The above and other objects, features and advantages of the present invention will be apparent from the following description of preferred embodiments of the invention with reference to the accompanying drawings.

BRIEF DESCRIPTION OF THE DRAWINGS

FIG. 2 illustrates an example of a specific construction of the register bank;

FIG. 3 is a flow chart illustrating the interrupt handling program executed in the data processor in accordance with the present invention; and FIG. 4 is a data storage diagram of the program memory in another embodiment of the data processor in accordance with the present invention.

DESCRIPTION OF THE PREFERRED EMBODIMENTS

Figure 1:
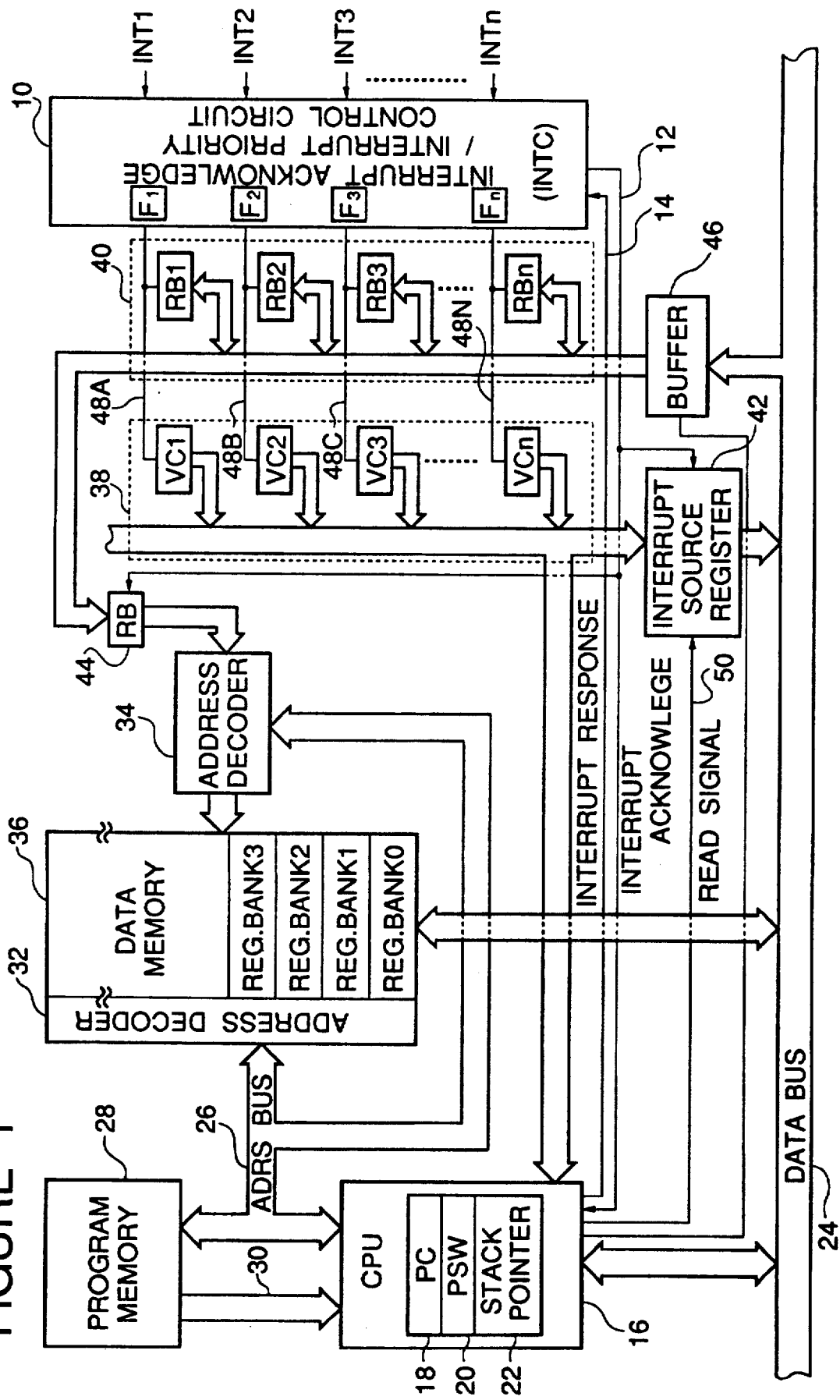
FIG. 1 is a block diagram of an embodiment of the data processor in accordance with the present invention.

Referring to FIG. 1, there is shown a block diagram of an embodiment of the data processor in accordance with the present invention. The data processor shown is a microcomputer capable of dealing with "n" interrupt request signals INT1, INT2, INT3, ... INTn from peripheral devices (not shown).

The microprocessor includes an interrupt acknowledge/interrupt priority control circuit (INTC) 10 which receives the "n" interrupt request signals INT1, INT2, INT3, ... INTn and discriminates an interrupt acceptable or enable condition and an interrupt priority level when an interrupt request signal is received. This interrupt controller 10 generates an interrupt acknowledge signal 12, transmit it to a CPU 16 and receives an interrupt response signal 14 from the CPU 16. The CPU 16 includes a program counter PC 18, a program status word PSW 20, and a stack pointer 22 as well as an arithmetic logic unit and other stages (not shown) which are well known to person skilled in the art. The CPU 16 is coupled to a data bus 24 and an address bus 26 which is coupled to a program memory 28. This program memory 28 outputs to the CPU 16 through a bus 30 an instruction code read in accordance with an address provided on the address bus 26. The address bus 26 is also coupled to two address decoders 32 and 34 associated with a data memory 36, which includes a data storage area, three sets or banks of general registers (called "register banks" hereinafter) 1, 2 and 3 and another register bank 0 used for a main program other than an interrupt handling program. The data memory 36 is coupled to the data bus 24 so as to receive data to be written into the data memory 36 through the data bus 24 from the CPU 16 and to output data read out of the data memory 36 through the data bus 24 to the CPU 16.

In addition, an interrupt code generator 38 and a register bank selection controller 40 are associated with the interrupt controller 10. The interrupt code generator 38 generates a constant code corresponding to each given interrupt request signal. This constant code is called a "interrupt code" in this specification. An output of the interrupt code generator 38 is coupled to the CPU 16 and an interrupt source register 42, which is coupled to the data bus. On the other hand, the register bank selection controller 40 stores information designating a register bank used for each interrupt request process, and generates a register bank designation code in response to a given interrupt request. An output of the register bank selection controller 40 is coupled to a register bank designation register 44, which is in turn coupled to the address decoder 34. Furthermore, also coupled to the register bank designation register RB 44, is a buffer 46 which is coupled to the data bus 24.

More specifically, the program counter PC 18 operates to designate an address for the program memory 28. The program status word PSW 20 indicates the status of a program. The stack pointer 22 designates an address of the data memory for saving the contents of the PC 18 and the PSW 20 when the interrupt acknowledge signal 12 is generated. On the other hand, the address decoder 32 decodes an address outputted on the address bus 26 from the CPU 16 to select a corresponding address of the data memory 36. In addition, the address decoder 34 operates to decode a value of the register bank designation register 44 and a register address outputted on the address bus 26 from the CPU 16 so as to select one of a plurality of register banks on the basis of the value of the register bank designation register 44 and to select a general register within the selected register bank on the basis of the register address provided from the CPU 16.

Furthermore, the interrupt controller 10 includes therein "n" interrupt request flags F1, F2, F3, ... Fn corresponding to the "n" interrupt request signals INT1, INT2, INT3, ... INTn. When an interrupt request signal INT1, INT2, INT3, ... or INTn is inputted, a corresponding interrupt request flag F1, F2, F3, ... or Fn is set to "1" to generate an active interrupt control signal 48A, 48B, 48C, ... or 48N. Each of the interrupt control signals 48A, 48B, 48C, ... or 48N is coupled to a corresponding interrupt code register VC1, VC2, VC3, ... or VCn of the interrupt code generator 38 and a corresponding bank designation register RB1, RB2, RB3, ... or RBn of the register bank selection controller 40, so that only one interrupt code register VC1, VC2, VC3, ... or VCn receiving the active interrupt control signal 48A, 48B, 48C, ... or 48N will output the interrupt code stored therein to the CPU 16 and the interrupt source register 42, and only one bank designation register RB1, RB2, RB3, ... or RBn receiving the active interrupt control signal 48A, 48B, 48C, ... or 48N will output the bank designation code stored therein to the register bank designation register 44.

Now, assuming that the interrupt request signal INT2 is generated externally, the interrupt request flag F2 is set to "1" in response to the generated interrupt request signal INT2. Therefore, only the interrupt control signal 48B is activated, so that the interrupt code register VC2 is selected within the interrupt code generator 38 so as to output the interrupt code corresponding to the generated interrupt request signal INT2 to the CPU 16 and the interrupt source register 42. On the other hand, the bank designation register RB2 is selected within the register bank selection controller 40 to output the bank designation code corresponding to the generated interrupt request signal INT2.

When the interrupt controller 10 receives the interrupt request signal INT2, the interrupt controller discriminates or determines the interrupt acceptable or enable condition and the interrupt priority level of the interrupt request signal INT2. If it is discriminated or determined that the interrupt request signal INT2 is in the interrupt enable condition and that the priority level of the interrupt request INT2 is higher than a process currently under execution, the interrupt controller activates the interrupt acknowledge signal 12 supplied to the CPU 16. In response to the active interrupt acknowledge signal 12, the register bank designation register 44 latches the bank designation code outputted from the bank designation register RB2, and the interrupt source register 42 latches the interrupt code outputted from the interrupt code register VC2. This interrupt source register 42 maintains the latched interrupt code until the next interrupt request is acknowledged.

When the CPU 16 receives the active interrupt acknowledge signal 12, the CPU operates as follows. When the format of the interrupt acknowledge signal is the vector interrupt type, the CPU 16 generates a start address for the interrupt handling program on the basis of the interrupt code VC2, and thereafter, outputs the interrupt response signal 14 for the interrupt controller 10 so as to cause it to reset the corresponding interrupt request flag F2 to "0". With this, the interrupt process is started. With the resetting of the interrupt request flag F2, another interrupt request signal will become acceptable. However, the interrupt acknowledge signal 12 is not activated because of the interrupt disable condition. The system is put in an interrupt enable condition by a programmed operation, and thereafter, the interrupt acknowledge signal can be activated in response to another interrupt request signal.

In the case of the register bank switching interrupt, a bank designation code corresponding to the interrupt request is latched in the register bank designation register 44 in response to the interrupt acknowledge signal 12, and decoded by the address decoder 34 so that the register bank to be used is switched to a predetermined register bank. Here, each of the register banks 1, 2 and 3 is formed for example as shown in FIG. 2. Therefore, the CPU 16 operates to save the contents of the PC 18 and the PSW 20 in the PC save area and the PSW save area of the switched or selected register bank, and also to set the PC 18 with a start address of the interrupt program previously stored in the selected register bank. Thereafter, the CPU 16 outputs the interrupt response signal 14 to the interrupt controller 10 so as to cause it to reset the corresponding interrupt request flag to "0". With this, the interrupt process is started.

Similar to the vector interrupt, another interrupt request signal will become acceptable with the resetting of the interrupt request flag. However, the interrupt acknowledge signal 12 is not activated because of the interrupt disable condition. The system is put in an interrupt enable condition by a programmed operation, and thereafter, the interrupt acknowledge signal can be activated in response to another interrupt request signal.

Since only one start address of the interrupt program is set in each of the register banks, in case the same register bank is commonly used for a plurality of interrupts, the contents of the interrupt source register 42 is discriminated in the interrupt handling program so that the operation will branch to an interrupt process designated by the interrupt code set in the interrupt source register 42.

For example, as shown in the flow chart of FIG. 3, an instruction for reading the value of the interrupt source register 42 and for writing it into a general register is executed. When this instruction is executed, a read signal 50 is generated for the interrupt source register 42, so that the contents of the interrupt source register 42 is read out onto the data bus 24. The contents read out onto the data bus 24 is written in a general register of the selected register bank. Since the interrupt source register 42 stores, without exception, the code corresponding to the interrupt request on the basis of which the interrupt processing program is executed, the CPU 16 discriminates or determines the interrupt request for the interrupt process currently under execution on the basis of the value of the general register which has fetched the contents of the interrupt source register 42. Thereafter, the CPU branches to a start address of a process corresponding to the interrupt request. Thus, a process corresponding to each interrupt request can be started.

Referring to FIG. 4, there is shown the contents of the program memory 28 illustrating a second embodiment of the data processor in accordance with the present invention. In the program memory shown in FIG. 4, a memory address PC'+1 stores a branch instruction going to a start address of interrupt program process 1, and a memory address PC'+2 stores a branch instruction going to a start address of interrupt program process 2. A memory address PC'+3 stores a branch instruction going to a start address of interrupt program process 3.

The second embodiment can be realized for the data processor shown in FIG. 1. When the register bank switching operation is started in response to the interrupt acknowledge signal 12, the bank designation code is generated by the register bank selection controller 40 and latched in the register bank designation register RB 44. In accordance with the code latched in the register bank designation register RB 44, a register bank to be used for an interrupt process is selected from the plurality of register banks within the data memory 36. The selected register bank previously stores a start address of the interrupt program, as explained hereinbefore and as shown in FIG. 2. In this second embodiment, the value stored as a start address of the interrupt program is added to the interrupt code latched in the interrupt source register 42 in correspondence to the acknowledged interrupt request signal, and the result of this addition is set in the program counter PC 18. For example, assuming the interrupt codes are 1, 2 and 3, when the interrupt code is 1, the memory address PC'+1 of the program memory 28 is accessed, so that the branch instruction going to a start address of interrupt program process 1 is executed. When the interrupt code is 2, the memory address PC'+2 of the program memory 28 is accessed so that the branch instruction going to a start address of interrupt program processing 2 is executed. In addition, when the interrupt code is 3, the memory address PC'+3 of the program memory 28 is accessed, so that the branch instruction going to a start address of interrupt program processing 3 is executed. Accordingly, process corresponding to each interrupt request is started.

In the second embodiment, it is not necessary to discriminate the interrupt code by way of execution of the interrupt handling program so as to branch to a process corresponding to each interrupt request.

As seen from the above mentioned description of the embodiments made with reference to the accompanying drawings, the data processor in accordance with the present invention is characterized by provision of the interrupt source register which stores the interrupt code indicative of the interrupt source for a started interrupt process and which can be read by an operation of the CPU on the basis of an instruction. With the provision of the interrupt source register, it is possible to discriminate the interrupt request by reading the interrupt source register interrupt handling program execution. Therefore, even if a plurality of interrupt requests are assigned to the same register bank due to a physical limitation of the register banks, the register bank interrupt system, which has better operation efficiency than the vector interrupt system, can be used for the plurality of interrupt requests.

The invention has thus been shown and described with reference to the specific embodiments. However, it should be noted that the present invention is in no way limited to the details of the illustrated structures but changes and modifications may be made within the scope of the appended claims.

We claim:

1. A data processor, comprising:
a plurality of general register banks;
a central processing unit, coupled to said general register banks, for using said general register banks for executing a given process;
interrupt control means, responsive to an inputted interrupt request signal requesting register bank switching interrupt mode operation, for outputting an interrupt acknowledge signal to said central processing unit,
said interrupt control means selecting from among said general register banks a particular general register bank assigned in common to a plurality of interrupt request signals including said inputted interrupt request signal,
said interrupt control means initiating execution of an interrupt handling program using said particular general register bank;
means, coupled to said interrupt control means, for generating an interrupt code corresponding to said inputted interrupt request signal when said interrupt control means responds to said inputted interrupt request signal;
interrupt code holding means, coupled to said means for generating, for receiving and holding said interrupt code, after said interrupt acknowledge signal is outputted and until a subsequent interrupt acknowledge signal is outputted from said interrupt control means, for indicating which interrupt request signal of said plurality of interrupt request signals, to which said particular general register bank is assigned in common, corresponds to a currently executed interrupt process;
storing means, responsive to said interrupt code and a base address code, for storing an interrupt determination code formed from said interrupt code and said base address code for identifying an interrupt process start address when said inputted request signal is for a vector interrupt mode of operation; and
means, responsive to said interrupt determination code, for controlling a start address of said interrupt handling program in accordance with said interrupt determination code held in said hold means.

2. A data processor, comprising:
(a) a plurality of register banks coupled to a data bus, including at least one register bank assigned in common to a plurality of interrupt request signals;
(b) a central processing unit, coupled to said data bus, for using said plurality of register banks for executing a program and for outputting an address on an address bus, said central processing unit including a program counter and a program status word storage unit;
(c) a program memory, coupled to receive said address from said central processing unit through said address bus, for outputting an instruction to said central processing unit;
(d) an interrupt controller, coupled to receive said interrupt request signals from a plurality of external devices, for generating an interrupt acknowledge signal in response to a received interrupt request signal included in said interrupt request signals;
(e) an interrupt code generator, controlled by said interrupt controller, for generating an interrupt code corresponding to said received interrupt request signal;
(f) a register bank selection controller, controlled by said interrupt controller, for outputting a register bank designation signal to said plurality of register banks for selecting at least one register bank for use by said central processing unit said at least one register bank assigned in common to said plurality of interrupt request signals including said received interrupt request signal; and
(g) an interrupt source register, coupled to said interrupt code generator for receiving said interrupt code and coupled to said data bus, for latching said interrupt code for indicating that a particular interrupt request signal of a plurality of input request signals, to which said at least one register bank selected by said register bank selection controller is assigned in common, corresponds to a currently executed interrupt process;

(h) said central processing unit being coupled to said plurality of register banks and being responsive to said interrupt acknowledge signal
  (1) for outputting both current program counter contents of said program counter and current program status word contents of said program status word storage unit for storage of both said contents in said at least one register bank selected by said register bank designation signal,
  (2) for accessing said at least one register bank to obtain a pre-stored base interrupt program address and for setting said pre-stored base interrupt program address in said program counter, and
  (3) for initiating execution of an interrupt handling program;

(i) said central processing unit includes means for, during said execution of said interrupt handling program when said register bank designation signal selects said at least one register bank assigned in common to a plurality of interrupt signals,
  (1) determining, via said data bus, said interrupt code latched in said interrupt source register,
  (2) determining a start address of an interrupt program in response to said interrupt code and said pre-stored base interrupt program address, and
  (3) branching to said start address of said interrupt program corresponding to said interrupt code.

3. A data processor as claimed in claim 2, wherein said program memory includes at least first and second addresses identified by respectively adding first and second predetermined numbers to a start address of an interrupt program, said start address being previously stored in said at least one register bank, said first address storing a branch instruction for branching to a start address of a first interrupt program corresponding to a first interrupt request signal, and said second address storing a branch instruction for branching to a start address of a second interrupt program corresponding to a second interrupt request signal, said at least one register bank being assigned in common to said first and second interrupt request signals, wherein said interrupt code generator generates said first predetermined number as a first interrupt code corresponding to said first interrupt request signal, and said second predetermined number as a second interrupt code corresponding to said second interrupt request signal, wherein said central processing unit reads a content of said interrupt source register through said data bus during said execution of said interrupt handling program and adds said content read to said start address of an interrupt program previously stored in said at least one register bank to obtain an addition result, and wherein said central processing unit executes an instruction at an address of said program memory corresponding to said addition result to branch to a start address of an interrupt program corresponding to said received interrupt request signal.

* * * * *